(12) United States Patent
Kim et al.

(10) Patent No.: US 10,922,800 B2
(45) Date of Patent: Feb. 16, 2021

(54) IMAGE PROCESSING CIRCUIT, DISPLAY DEVICE HAVING THE SAME, AND METHOD OF DRIVING THE DISPLAY DEVICE

(71) Applicant: Samsung Display Co., Ltd., Yongin-Si (KR)

(72) Inventors: Jinpil Kim, Suwon-si (KR); Hoisik Moon, Hwaseong-si (KR); Jaesung Bae, Suwon-si (KR); Jeongwoon Lee, Cheonan-si (KR); Namjae Lim, Gwacheon-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/380,324

(22) Filed: Apr. 10, 2019

(65) Prior Publication Data

US 2019/0333196 A1    Oct. 31, 2019

(30) Foreign Application Priority Data

Apr. 27, 2018  (KR) .......................... 10-2018-0049371

(51) Int. Cl.
G09G 3/36        (2006.01)
G06T 5/00        (2006.01)
G06T 5/50        (2006.01)

(52) U.S. Cl.
CPC .............. *G06T 5/009* (2013.01); *G06T 5/50* (2013.01); *G09G 3/36* (2013.01); *G09G 2320/028* (2013.01); *G09G 2320/0673* (2013.01)

(58) Field of Classification Search
CPC ... G09G 2320/0276; G09G 2320/0673; H04N 5/202; H04N 9/69
See application file for complete search history.

(56) References Cited

U.S. PATENT DOCUMENTS 7,173,599 B2 *  2/2007  Nishimura ............. G09G 3/342
                                                345/102
7,817,171 B2 * 10/2010  Shiomi ................ G09G 3/3607
                                                345/690

(Continued)

FOREIGN PATENT DOCUMENTS

KR     1020150081397 A     7/2015
KR     1020170035387 A     3/2017

(Continued)

*Primary Examiner* — Antonio A Caschera
(74) *Attorney, Agent, or Firm* — Cantor Colburn LLP

(57) ABSTRACT

An image processing circuit includes a memory, a gamma converter which converts a first image data signal of a frame to a current image data signal thereof corresponding to first or second gamma types based on a spatial distribution pattern, a compression circuit which separates the current image data signal into first and second gamma signals corresponding to the first and second gamma types and compresses the first and second gamma signals to first and second compression gamma signals to store the first and second compression gamma signals, a decompression circuit which output a previous image data signal of a previous frame by decompressing the first and second compression gamma signals and combines first and second decompression gamma signals, and a gamma correction circuit which performs a gamma adjustment based on current and previous image data signals to output a second image data signal.

20 Claims, 13 Drawing Sheets

(56) References Cited

U.S. PATENT DOCUMENTS

| | | |
|---|---|---|
| 10,032,426 B2 | 7/2018 | Kim et al. |
| 10,038,910 B2 | 7/2018 | Jeong et al. |
| 2015/0195581 A1 | 7/2015 | Lee et al. |
| 2016/0019846 A1 | 1/2016 | Kim et al. |
| 2016/0372055 A1* | 12/2016 | Zehner .................. G09G 3/2018 |
| 2017/0169753 A1* | 6/2017 | Hao ..................... G09G 3/3607 |
| 2019/0147792 A1 | 5/2019 | Kim et al. |

FOREIGN PATENT DOCUMENTS

| | | |
|---|---|---|
| KR | 101835318 B1 | 3/2018 |
| KR | 1020190055290 A | 5/2019 |

* cited by examiner

IMAGE PROCESSING CIRCUIT, DISPLAY DEVICE HAVING THE SAME, AND METHOD OF DRIVING THE DISPLAY DEVICE

This application claims priority to Korean Patent Application No. 10-2018-0049371, filed on Apr. 27, 2018, and all the benefits accruing therefrom under 35 U.S.C. § 119, the content of which in its entirety is herein incorporated by reference.

BACKGROUND

1. Field

The disclosure relates to a display device. More particularly, the disclosure relates to a display device including an image processing circuit.

2. Description of the Related Art

As one of display devices, a liquid crystal display device has been applied to various fields, e.g., a notebook computer, a monitor, a display for advertising, a television set, etc., due to its characteristics such as slim design, low power consumption, high resolution, etc.

However, the liquid crystal display device may have contrast and color that vary with a viewing direction due to a dielectric anisotropy of a liquid crystal. In recent years, demand continues to increase for the liquid crystal display device having a wide viewing angle characteristic to improve on a present narrow viewing angle characteristic.

SUMMARY

The disclosure provides an image processing circuit for improving a display quality.

The disclosure provides a display device having the image processing circuit.

The disclosure provides a method of driving the display device with improved display quality.

In an exemplary embodiment of the invention, an image processing circuit includes a memory, a gamma converter which converts a first image data signal of a frame to output a current image data signal of a current frame corresponding to one of a first gamma type and a second gamma type based on a spatial distribution pattern, a compression circuit which separates the current image data signal of the current frame into a first gamma signal corresponding to the first gamma type and a second gamma signal corresponding to the second gamma type and which compresses the first gamma signal and the second gamma signal to a first compression gamma signal and a second compression gamma signal, respectively, where the first compression gamma signal and the second compression gamma signal are stored in the memory, a decompression circuit which decompresses the first compression gamma signal and the second compression gamma signal stored in the memory and combines a first decompression gamma signal and a second decompression gamma signal to output a previous image data signal of a previous frame, and a gamma correction circuit which performs a gamma adjustment based on a current image data signal of the current frame and the previous image data signal of the previous frame to output a second image data signal of the current frame.

In an exemplary embodiment, the first gamma type may be based on a high gamma curve, and the second gamma type may be based on a low gamma curve.

In an exemplary embodiment, the gamma converter may include a high gamma converter which converts the first image data signal of the frame to a high gamma signal based on the high gamma curve corresponding to the first gamma type, a low gamma converter which converts the first image data signal of the frame to a low gamma signal based on the low gamma curve corresponding to the second gamma type, and a selection output unit which outputs one of the high gamma signal and the low gamma signal as the current image data signal of the current frame.

In an exemplary embodiment, the compression circuit may include a separator which separates the current image data signal of the current frame into the first gamma signal corresponding to the first gamma type and the second gamma signal corresponding to the second gamma type, a first compressor which compresses the first gamma signal to output the first compression gamma signal, and a second compressor which compresses the second gamma signal to output the second compression gamma signal.

In an exemplary embodiment, the decompression circuit may include a first decompressor which decompresses the first compression gamma signal from the memory to output the first decompression gamma signal, a second decompressor which decompresses the second compression gamma signal from the memory to output the second decompression gamma signal, and a combiner which combines the first decompression gamma signal and the second decompression gamma signal to output the previous image data signal of the previous frame.

In an exemplary embodiment of the invention, a display device includes a display panel includes a plurality of data lines, a plurality of gate lines, and a plurality of pixels connected to the data lines and the gate lines, a drive controller which receives a first image data signal of a frame to perform a gamma adjustment and outputs a second image data signal of a current frame, and a data driver which provides the second image data signal of the current frame to the data lines. In such an embodiment, the drive controller includes a memory, a gamma converter which converts the first image data signal of the frame to a current image data signal of the current frame corresponding to one of a first gamma type and a second gamma type depending on a position in the display panel, at which an image corresponding to the first image data signal of the frame is displayed, a compression circuit which separates the current image data signal of the frame into a first gamma signal corresponding to the first gamma type and a second gamma signal corresponding to the second gamma type and respectively compresses the first gamma signal and the second gamma signal to a first compression gamma signal and a second compression gamma signal to store the first compression gamma signal and the second compression gamma signal in the memory, a decompression circuit which decompresses the first compression gamma signal and the second compression gamma signal stored in the memory and combines a first decompression gamma signal and a second decompression gamma signal to output a previous image data signal of a previous frame, and a gamma correction circuit which performs a gamma adjustment based on a current image data signal of the current frame and the previous image data signal of the previous frame to output the second image data signal of the current frame.

In an exemplary embodiment, the first gamma type may be based on a high gamma curve, and the second gamma type may be based on a low gamma curve.

In an exemplary embodiment, the gamma converter may include a high gamma converter which converts the first image data signal of the frame to a high gamma signal based on the high gamma curve corresponding to the first gamma type, a low gamma converter which converts the first image data signal of the frame to a low gamma signal based on the low gamma curve corresponding to the second gamma type, and a selection output unit which outputs one of the high gamma signal and the low gamma signal as the current image data signal of the f current rame depending on a position in the display panel, at which the image corresponding to the first image data signal of the frame is displayed.

In an exemplary embodiment, the compression circuit may include a separator which separates the current image data signal of the current frame into the first gamma signal corresponding to the first gamma type and the second gamma signal corresponding to the second gamma type, a first compressor which compresses the first gamma signal to output the first compression gamma signal, and a second compressor which compresses the second gamma signal to output the second compression gamma signal.

In an exemplary embodiment, the decompression circuit may include a first decompressor which decompresses the first compression gamma signal from the memory to output the first decompression gamma signal, a second decompressor which decompresses the second compression gamma signal from the memory to output the second decompression gamma signal, and a combiner which combines the first decompression gamma signal and the second decompression gamma signal to output the previous image data signal of the previous frame.

In an exemplary embodiment, the memory may include a first area and a second area, the first compression gamma signal may be stored in the first area of the memory, and the second compression gamma signal may be stored in the second area of the memory.

In an exemplary embodiment, the gamma correction circuit may include a dynamic capacitance compensation ("DCC") circuit.

In an exemplary embodiment, the gamma converter may output a first image data signal of the frame as the current image data signal of the current frame when the first image data signal is a spatially distributed signal.

In an exemplary embodiment, the display device may further include a setting circuit which receives a mode signal indicating whether the first image data signal is the spatially distributed signal and outputs a conversion selection signal corresponding to the mode signal. In such an embodiment, the gamma converter may output the first image data signal of the frame as the current image data signal of the current frame when the conversion selection signal has a second level.

In an exemplary embodiment, the gamma converter may convert the first image data signal of the frame to the current image data signal of the current frame corresponding to one of the first gamma type and the second gamma type when the conversion selection signal has a first level different from the second level.

In an exemplary embodiment of the invention, a method of driving a display device, which includes a display panel including a plurality of data lines, a plurality of gate lines, and a plurality of pixels connected to the data lines and the gate lines, includes converting a first image data signal of a frame to a current image data signal of a current frame corresponding to one of a first gamma type and a second gamma type depending on a position in the display panel, at which an image corresponding to the first image data signal of the frame is displayed, separating the current image data signal of the current frame into a first gamma signal corresponding to the first gamma type and a second gamma signal corresponding to the second gamma type, compressing the first gamma signal and the second gamma signal to a first compression gamma signal and a second compression gamma signal, respectively, to store the first compression gamma signal and the second compression gamma signal in a memory, decompressing the first compression gamma signal and the second compression gamma signal stored in the memory, combining the decompressed first compression gamma signal and the decompressed second compression gamma signal to output a previous image data signal of a previous frame, and performing a gamma adjustment based on a current image data signal of the current frame and the previous image data signal of the previous frame to output a second image data signal of the previous frame to the pixels.

In an exemplary embodiment, the first gamma type may be based on a high gamma curve, and the second gamma type may be based on a low gamma curve In an exemplary embodiment, the converting the first image data signal of the frame may include converting the first image data signal of the frame to a high gamma signal based on the high gamma curve corresponding to the first gamma type, converting the first image data signal of the frame to a low gamma signal based on the low gamma curve corresponding to the second gamma type, and outputting one of the high gamma signal and the low gamma signal as the current image data signal depending on the position in the display panel, at which the image corresponding to the first image data signal is displayed.

In an exemplary embodiment, the memory may include a first area and a second area, the first compression gamma signal may be stored in the first area of the memory, and the second compression gamma signal may be stored in the second area of the memory.

In an exemplary embodiment, the method may further include receiving a mode signal indicating whether the first image data signal of the frame is a spatially distributed signal and outputting a conversion selection signal corresponding to the mode signal, outputting the first image data signal of the frame as it is as a current image data signal of the current frame when the conversion selection signal has a second level; and converting the first image data signal of the frame and outputting a converted first image data signal as the current image data signal when the conversion selection signal has a first level different from the second level, where the converted first image data signal corresponds to the one of the first gamma type and the second gamma type.

According to exemplary embodiments, the display device simultaneously displays the image corresponding to the high gamma curve and the image corresponding to the low gamma curve through the display panel based on the spatial distribution pattern, and thus the wide viewing angle of the display panel may be improved. In such embodiments, among the image data signals of the one frame, the image data signal corresponding to the high gamma curve and the image data signal corresponding to the low gamma curve are individually compressed, stored in the memory, and decompressed. Thus, the storage capacity of the memory may be reduced, and noise of the decompressed image data signal may be reduced.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Hereinafter, exemplary embodiments of the disclosure will be described in detail with reference to the accompanying drawings. However, the disclosure may be variously modified and realized in many different forms, and thus the disclosure should not be construed as limited to the illustrated embodiments. Rather, these embodiments are provided as exemplary so that this disclosure will be thorough and complete and will fully convey the aspects and features of the disclosure to those skilled in the art.

It will be understood that when an element or layer is referred to as being "on", "connected to" or "coupled to" another element or layer, it can be directly on, connected or coupled to the other element or layer or intervening elements or layers may be present. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the invention will be described in detail with reference to the accompanying drawings.

Figure 1:
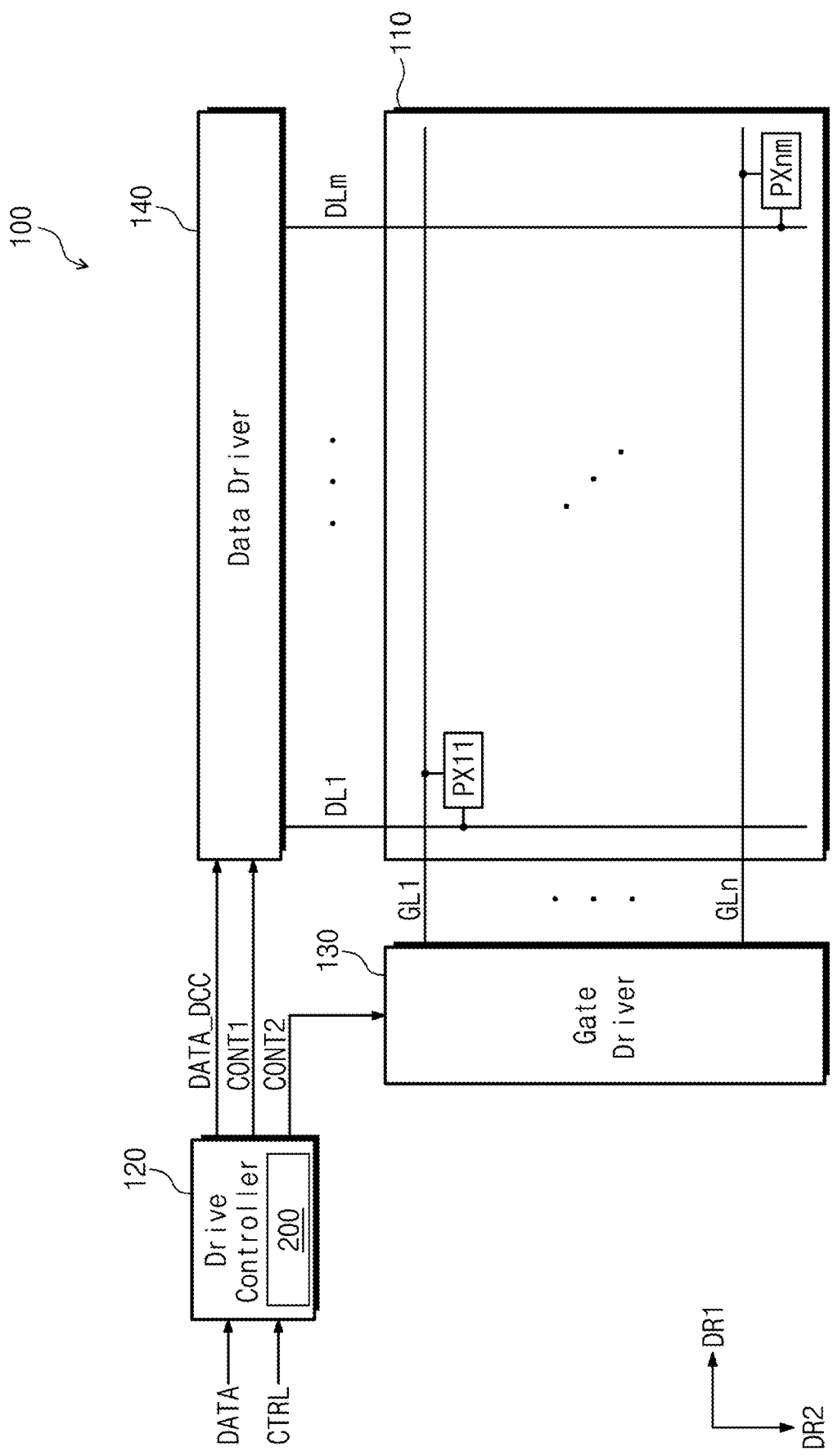
FIG. 1 is a block diagram showing a display device according to an exemplary embodiment of the disclosure.

FIG. 1 is a block diagram showing a display device 100 according to an exemplary embodiment of the disclosure.

Referring to FIG. 1, an exemplary embodiment of the display device 100 includes a display panel 110, a drive controller 120, a gate driver 130, and a data driver 140.

In an exemplary embodiment, the display panel 110 includes a plurality of gate lines GL1 to GLn extending in a first direction DR1, a plurality of data lines DL1 to DLm extending in a second direction DR2, and a plurality of pixels arranged in areas defined by the gate lines GL1 to GLn and the data lines DL1 to DLm crossing the gate lines GL1 to GLn. FIG. 1 shows only a pixel PX11 connected to the data line DL1 and the gate line GL1, however, the display panel 110 may include a plurality of pixels PX11 to PXnm connected to "n" gate lines GL1 to GLn and "m" data lines DL1 to DLm, respectively. Here, each of m and n are a natural number.

In an exemplary embodiment, the drive controller 120 receives a first image data signal DATA and control signals CTRL, e.g., a vertical synchronization signal, a horizontal synchronization signal, a main clock signal, a data enable signal, etc., from an external source or host (not shown). The drive controller 120 applies a second image data signal DATA_DCC, which is obtained by processing the first image data signal DATA by taking into account operating conditions of the display panel 110, and a first control signal CONT1 to the data driver 140 and applies a second control signal CONT2 to the gate driver 130 based on the control signals CTRL. The first control signal CONT1 includes a clock signal, a polarity inversion signal, and a line latch signal, and the second control signal CONT2 includes a vertical synchronization start signal and a gate pulse signal.

In an exemplary embodiment, the drive controller 120 includes an image processing circuit 200. The image processing circuit 200 performs a gamma correction on the first image data signal DATA to output the second image data signal DATA_DCC. Configurations and operations of the image processing circuit 200 will be described later in detail.

Figure 2:
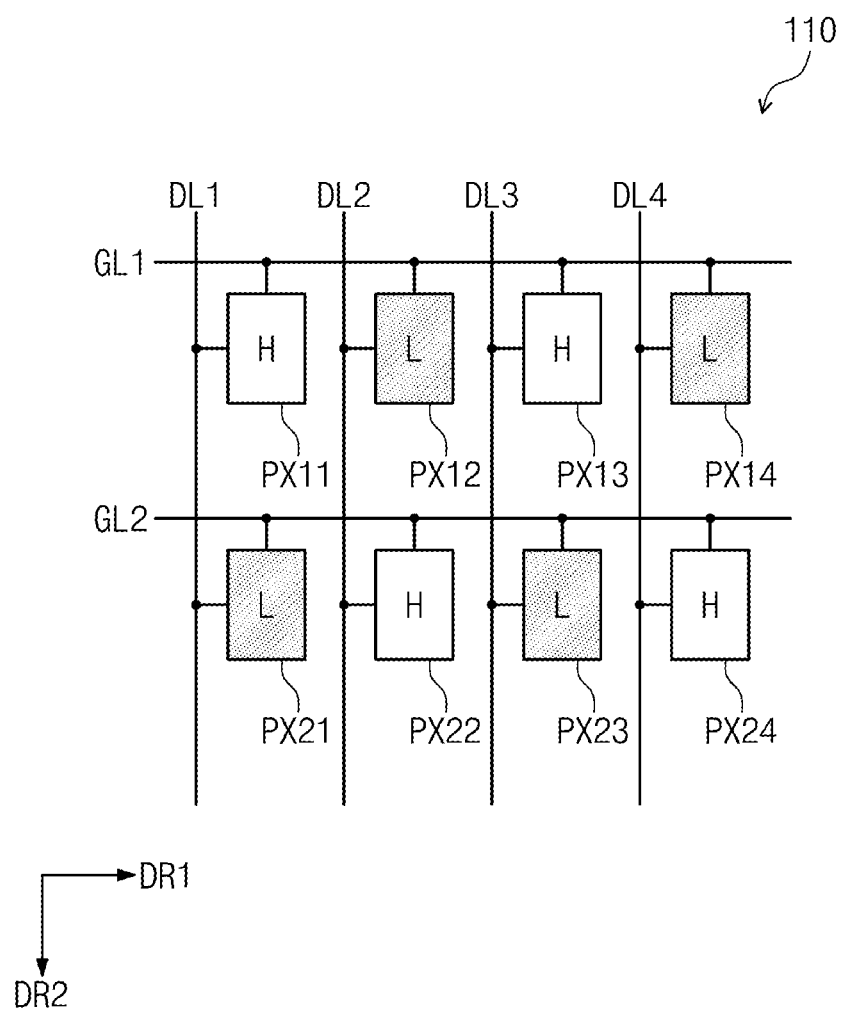
FIG. 2 is a view showing a spatial distribution pattern of an exemplary embodiment of pixels of a display panel.

FIG. 2 is a view showing a spatial distribution pattern of an exemplary embodiment of the pixels of the display panel 110.

Referring to FIG. 2, each of the pixels PX11 to PX14 and PX21 to PX24 on the display panel 110 is connected to a corresponding data line among the data lines DL1 to DL4 and a corresponding gate line among first and second gate lines GL1 and GL2. Each of the pixels PX11 to PX14 and PX21 to PX24 corresponds to one of a first gamma type H and a second gamma type L based on the spatial distribution pattern. In an exemplary embodiment, as shown in FIG. 2, pixels adjacent to each other among the pixels PX11 to PX14 and PX21 to PX24 correspond to different gamma types from each other. In one exemplary embodiment, for example, the pixels PX11 to PX14 connected to the first gate line GL1 and adjacent to each other in the first direction DR1 correspond to the first gamma type H, the second gamma type L, the first gamma type H, and the second gamma type L, respectively. In such an embodiment, the pixels PX21 to PX24 connected to the second gate line GL2 and adjacent to each other in the first direction DR1 correspond to the second gamma type L, the first gamma type H, the second gamma type L, and the first gamma type H, respectively. In such an embodiment, the pixels PX11 to PX14 and PX21 to PX24 alternately correspond to the first gamma type H and the second gamma type L at every frame. In one exemplary embodiment, for example, the pixels PX11, PX13, PX22, and PX24 corresponding to the first gamma type H in a k-th frame correspond to the second gamma type L in a (k+1)-th frame. In such an embodiment, the pixels PX12, PX14, PX21, and PX23 corresponding to the second gamma type L in the k-th frame correspond to the first gamma type H in the (k+1)-th frame.

FIG. 2 shows only eight pixels PX11 to PX14 and PX21 to PX24, however, each of m by n (i.e., m×n) pixels arranged in the display panel 110 shown in FIG. 1 corresponds to the first gamma type H or the second gamma type L in a manner similar to the pixels PX11 to PX14 and PX21 to PX24 based on the spatial distribution pattern. The first gamma type H and the second gamma type L respectively correspond to the pixels will be described later in greater detail.

Figure 3:
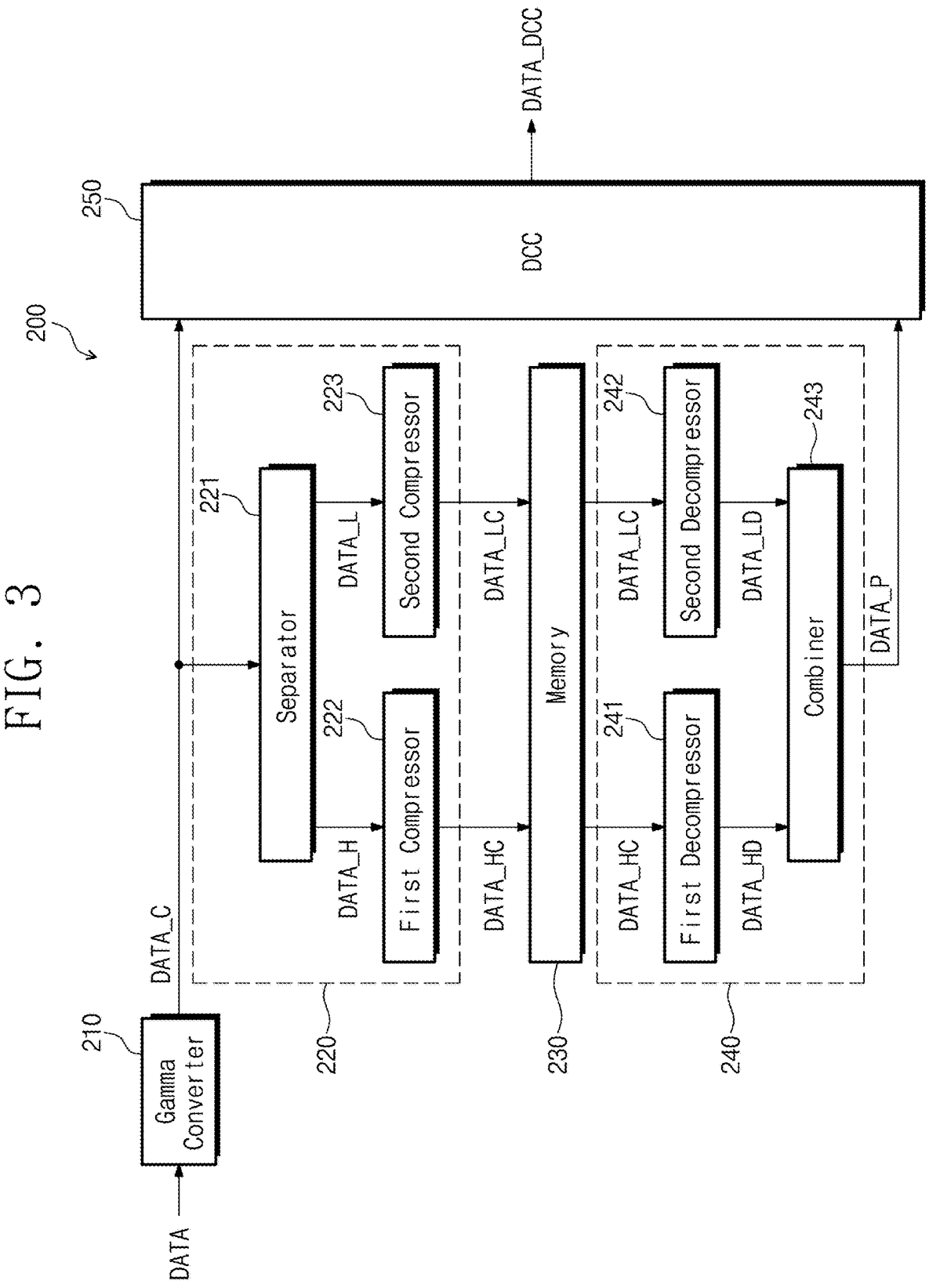
FIG. 3 is a block diagram showing an image processing circuit according to an exemplary embodiment of the disclosure.

FIG. 3 is a block diagram showing the image processing circuit 200 according to an exemplary embodiment of the disclosure.

Referring to FIG. 3, an exemplary embodiment of the image processing circuit 200 includes a gamma converter 210, a compression circuit 220, a memory 230, a decompression circuit 240, and a gamma correction circuit 250. The gamma converter 210 converts the first image data signal DATA of a frame to a current image data signal DATA_C of the frame corresponding to one of the first gamma type H and the second gamma type L based on the spatial distribution pattern.

The compression circuit 220 separates a current image data signal DATA_C of a previous frame into a first gamma signal DATA_H corresponding to the first gamma type H and a second gamma signal DATA_L corresponding to the second gamma type L, and compresses the first gamma signal DATA_H and the second gamma signal DATA_L to output a first compression gamma signal DATA_HC and a second compression gamma signal DATA_LC, respectively.

The memory 230 stores the first compression gamma signal DATA_HC and the second compression gamma signal DATA_LC.

The decompression circuit 240 decompresses the first compression gamma signal DATA_HC and the second compression gamma signal DATA_LC, which are stored in the memory 230, and combines the decompressed first compression gamma signal DATA_HC and the decompressed second compression gamma signal DATA_LC to output a previous image data signal DATA_P.

The gamma correction circuit 250 performs a gamma adjustment based on the current image data signal DATA_C from the gamma converter 210 and the previous image data signal DATA_P from the decompression circuit 240, and outputs the second image data signal DATA_DCC. The gamma correction circuit 250 may include a dynamic capacitance compensation ("DCC") circuit that compensates for a response speed based on a difference between the previous image data signal DATA_P of the previous frame and the current image data signal DATA_C of a current frame.

In an embodiment, where a storage capacity of the memory 230 is substantially high, the compression circuit 220 and the decompression circuit 240 may be omitted. In an exemplary embodiment, the storage capacity of the memory 230 is minimized to reduce cost using the compression circuit 220 and the decompression circuit 240.

Figure 4:
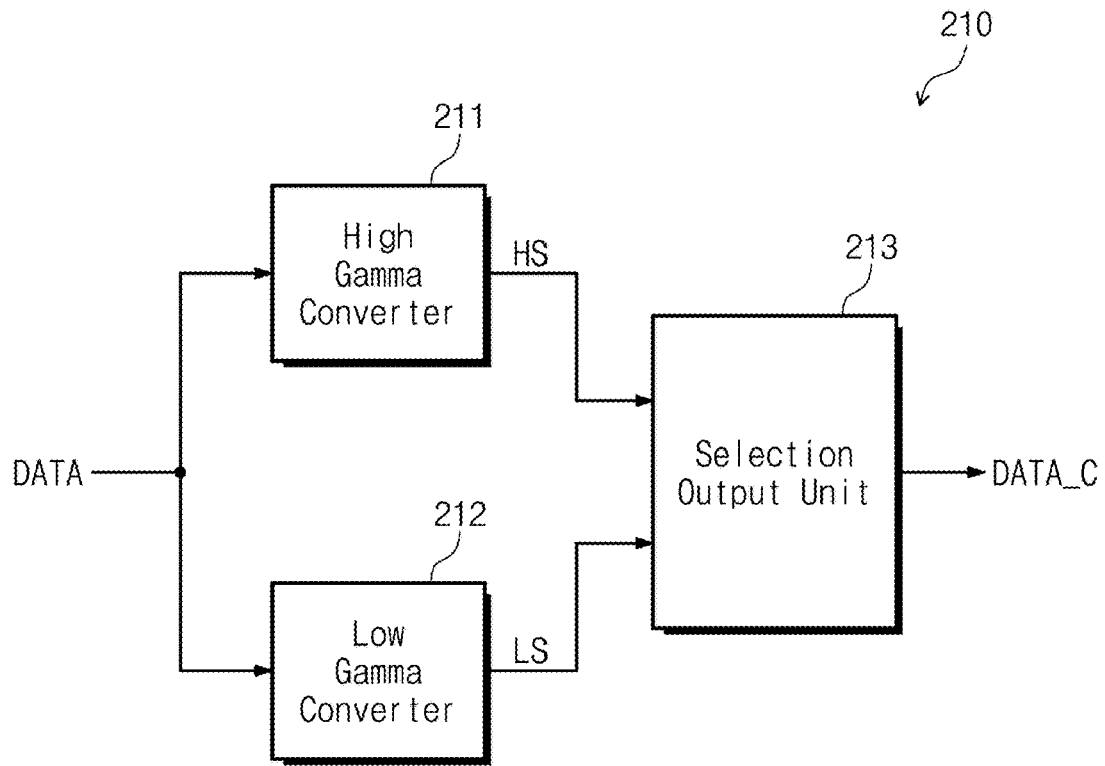
FIG. 4 is a block diagram showing a gamma converter according to an exemplary embodiment of the disclosure.

FIG. 4 is a block diagram showing a gamma converter according to an exemplary embodiment of the disclosure.

Referring to FIG. 4, an exemplary embodiment of the gamma converter 210 includes a high gamma converter 211, a low gamma converter 212, and a selection output unit 213. The high gamma converter 211 converts the first image data signal DATA to a high gamma signal HS corresponding to the first gamma type H. The low gamma converter 212 converts the first image data signal DATA to a low gamma signal LS corresponding to the second gamma type L. The selection output unit 213 outputs one of the high gamma signal HS and the low gamma signal LS as the current image data signal DATA_C depending on a position at which an image corresponding to the first image data signal DATA is displayed through the display panel 110 (refer to FIG. 1).

Figure 5:
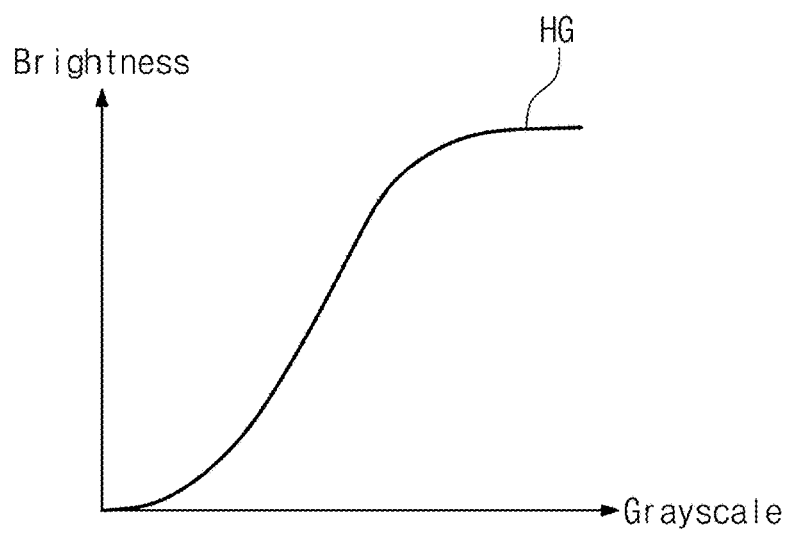
FIG. 5 is a graph showing a gamma-brightness relation represented by a high gamma curve.
Figure 6:
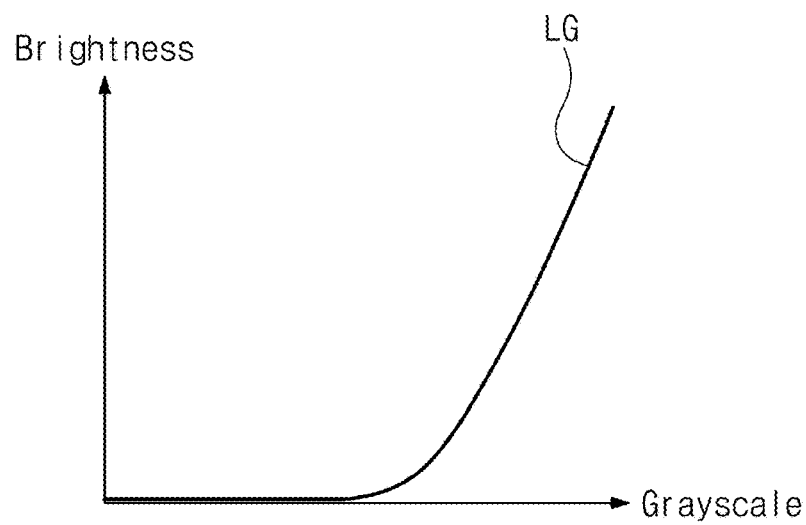
FIG. 6 is a graph showing a gamma-brightness relation represented by a low gamma curve.

FIG. 5 is a graph showing a gamma-brightness relationship represented by a high gamma curve, and FIG. 6 is a graph showing a gamma-brightness relationship represented by a low gamma curve.

Referring to FIGS. 4 to 6, the high gamma converter 211 converts the first image data signal DATA to the high gamma signal HS corresponding to the first gamma type H (refer to FIG. 2) based on the high gamma curve HG. The low gamma converter 212 converts the first image data signal DATA to the low gamma signal LS corresponding to the second gamma type L (refer to FIG. 2) based on the low gamma curve LG.

The high gamma curve HG and the low gamma curve LG have different gamma-brightness relationships from each other. In such an embodiment, when the first image data signal DATA having a predetermined gamma level is applied to the high gamma converter 211 and the low gamma converter 212, the high gamma signal HS converted based on the high gamma curve HG and the low gamma signal LS converted based on the low gamma curve LG correspond to different brightnesses from each other.

In an exemplary embodiment, the high gamma curve HG corresponds to a brightness in which a visibility from a side of the display panel 110 (refer to FIG. 1) is high, and the low gamma curve LG corresponds to a brightness in which a visibility from a front of the display panel 110 (refer to FIG. 1) is high. The gamma-brightness relationship of high gamma curve HG and the low gamma curve LG may be set differently depending on characteristics of the display device. In an exemplary embodiment, as shown in FIG. 2, the pixels adjacent to each other among the pixels PX11 to PX14 and PX21 to PX24 correspond to different gamma types from each other, such that the difference in visibility according to a viewer's location may be reduced.

Figure 7:
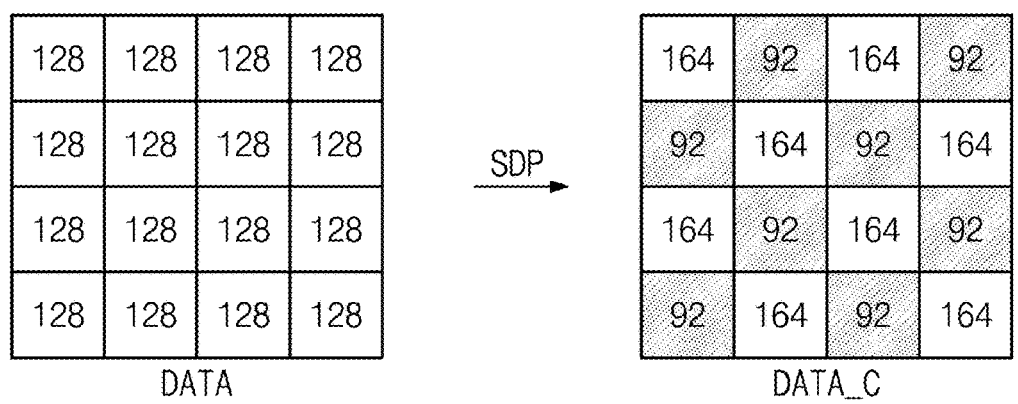
FIG. 7 is a view showing an exemplary embodiment of converting an image data signal to a current image data signal in accordance with a spatial distribution pattern.

FIG. 7 is a view showing an exemplary embodiment of converting an image data signal to a current image data signal in accordance with a spatial distribution pattern.

Referring to FIG. 7, the gamma converter 210 shown in FIG. 3 converts the first image data signal DATA of a frame to the current image data signal DATA_C of the frame corresponding to one of the first gamma type H and the second gamma type L based on the spatial distribution pattern and outputs the current image data signal DATA_C. In an exemplary embodiment, the gamma converter 210 may convert the first image data signal DATA of the frame to the current image data signal DATA_C of the frame according to a spatial distribution pixel ("SDP") algorithm. In one exemplary embodiment, for example, when a gamma level of the first image data signal DATA is 128, the gamma converter 210 may set a gamma level of the current image data signal DATA_C corresponding to the first gamma type H to 164 and set a gamma level of the current image data signal DATA_C corresponding to the second gamma type L to 92.

Referring to FIG. 7, there is shown that the first image data signal DATA of 4 by 4 (4×4) pixel size is converted to the current image data signal DATA_C of 4 by 4 (4×4) pixel size. The current image signal DATA_C of a first row is 164, 92, 164 and 92, and the current image signal DATA_C of a second row is 92, 164, 92 and 164. In general, the compression and decompression of the image signal are performed based on a difference value between the image signals corresponding to surrounding pixels of a compression target pixel. In addition, since the image signals corresponding to several to tens of pixels adjacent to each other have the same or similar gamma level, a compression rate of the image signals may become high, and compression and decompression circuits may be implemented simply. However, in case of the current image data signal DATA_C converted by the spatial distribution pixel algorithm, the difference in gamma level between the adjacent pixels is large. Accordingly, when the current image data signal DATA_C of FIG. 7 is compressed and decompressed, a noise component may be included in the decompressed image data signal.

Referring back to FIG. 3, an exemplary embodiment of the compression circuit 220 includes a separator 221, a first compressor 222 and a second compressor 223. In such an embodiment, the separator 221 separates the current image data signal DATA_C into the first gamma signal DATA_H corresponding to the first gamma type H and the second gamma signal DATA_L corresponding to the second gamma type L. The first compressor 222 compresses the first gamma signal DATA_H and outputs the first compression gamma signal DATA_HC. The second compressor 223 compresses the second gamma signal DATA_L and outputs the second compression gamma signal DATA_LC. Each of the first compressor 222 and the second compressor 223 may perform the compression operation based on a predetermined compression algorithm.

The first compression gamma signal DATA_HC and the second compression gamma signal DATA_LC are stored in the memory 230. Although not shown in figures, the memory 230 may include a first area and a second area. The first compression gamma signal DATA_HC is stored in the first area of the memory 230, and the second compression gamma signal DATA_LC is stored in the second area of the memory 230.

The decompression circuit 240 includes a first decompressor 241, a second decompressor 242, and a combiner 243. The first decompressor 241 receives the first compression gamma signal DATA_HC from the memory 230, and outputs a first decompression gamma signal DATA_HD based on a predetermined decompression algorithm. The second decompressor 242 receives the second compression gamma signal DATA_LC from the memory 230, and outputs a second decompression gamma signal DATA_LD based on the predetermined decompression algorithm. The combiner 243 combines the first decompression gamma signal DATA_HD and the second decompression gamma signal DATA_LD to output the previous image data signal DATA_P of a previous frame.

Figure 8:
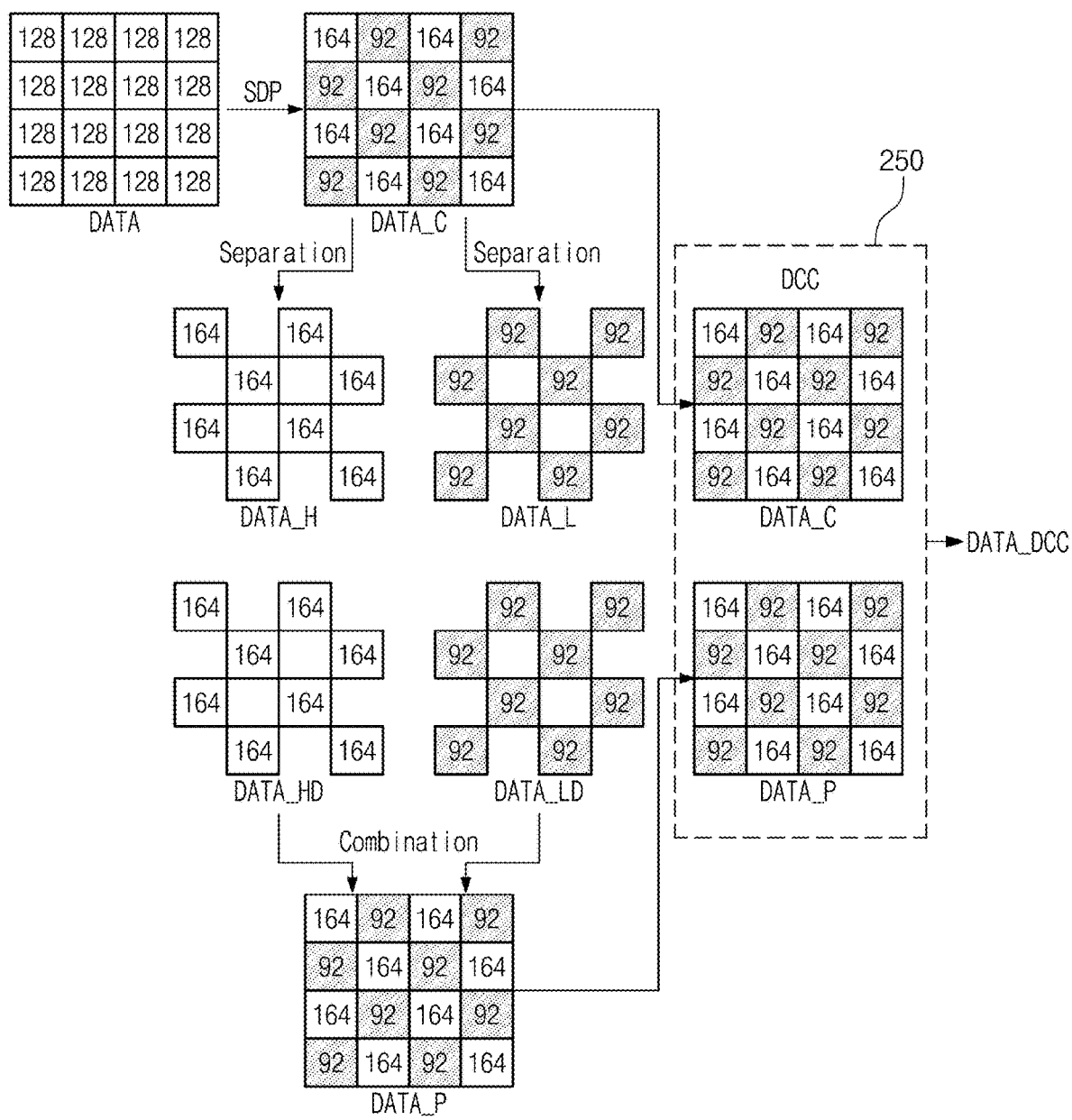
FIG. 8 is a view showing an exemplary embodiment of a process of converting a first image data signal to a second image data signal by the image processing circuit shown in FIG. 3.

FIG. 8 is a view showing an exemplary embodiment of a process of converting the first image data signal to the second image data signal by the image processing circuit shown in FIG. 3.

Referring to FIGS. 3 and 8, in an exemplary embodiment, the gamma converter 210 converts the first image data signal DATA of a frame to the current image data DATA_C of the frame using the SDP algorithm based on the spatial distribution pattern. The current image data signal DATA_C corresponding to a pixel of the display panel 110 corresponds to one of the first gamma type H and the second gamma type L depending on a position, at which an image corresponding to the current image data signal DATA_C is displayed, in the display panel 110, i.e., the position of the corresponding pixel to which the current image data signal DATA_C is applied.

The separator 221 separates the current image data signal DATA_C of the frame into the first gamma signal DATA_H corresponding to the first gamma type H and the second gamma signal DATA_L corresponding to the second gamma type L.

In an exemplary embodiment, since the first compressor 222 compresses only the first gamma signal DATA_H corresponding to the first gamma type H, the first gamma signals DATA_H corresponding to adjacent pixels may have the same or similar value. In such an embodiment, since the second compressor 223 compresses only the second gamma signal DATA_L corresponding to the second gamma type L, the second gamma signals DATA_L corresponding to adjacent pixels may have the same or similar value. Accordingly, in such an embodiment, the first compressor 222 and the second compressor 223 may perform the compression operation with simple circuit configurations, and the compression rate may be improved. In such an embodiment, the compression rate is improved, such that the storage capacity of the memory 230 may be substantially reduced or minimized.

The first decompressor 241 decompresses the first compression gamma signal DATA_HC from the memory 230 using the predetermined decompression algorithm to output the first decompression gamma signal DATA_HD. The second decompressor 242 decompresses the second compression gamma signal DATA_LC from the memory 230 using the predetermined decompression algorithm to output the second decompression gamma signal DATA_LD. The first decompression gamma signal DATA_HD corresponds to the first gamma type H, and the second decompression gamma signal DATA_LD corresponds to the second gamma type L. The noise component included in the first decompression gamma signal DATA_HD and the second decompression gamma signal DATA_LD may be minimized during the compression and decompression operations of the first gamma signal DATA_H corresponding to the first gamma type H and the second gamma signal DATA_L corresponding to the second gamma type L.

The combiner 243 combines the first decompression gamma signal DATA_HD and the second decompression gamma signal DATA_LD to output the previous image data signal DATA_P. In such an embodiment, the current image data signal DATA_C of the current frame is stored in the memory 230 after being compressed, and then the current image data signal DATA_C of the current frame is decompressed to be applied to the gamma correction circuit 250 as a previous image data signal DATA_P of a previous frame.

The gamma correction circuit 250 compares the previous image data signal DATA_P of the previous frame with the current image data signal DATA_C of the current frame, and performs the gamma correction on the current image data signal DATA_C of the current frame to output the second image data signal DATA_DCC of the current frame. In an exemplary embodiment, the storage capacity of the memory 230 may be about ⅛ or about 1/16 of the size of the current image data signal DATA_C of one frame, for example, but the storage capacity of the memory 230 may be variously changed depending on the compression rate.

Figure 9:
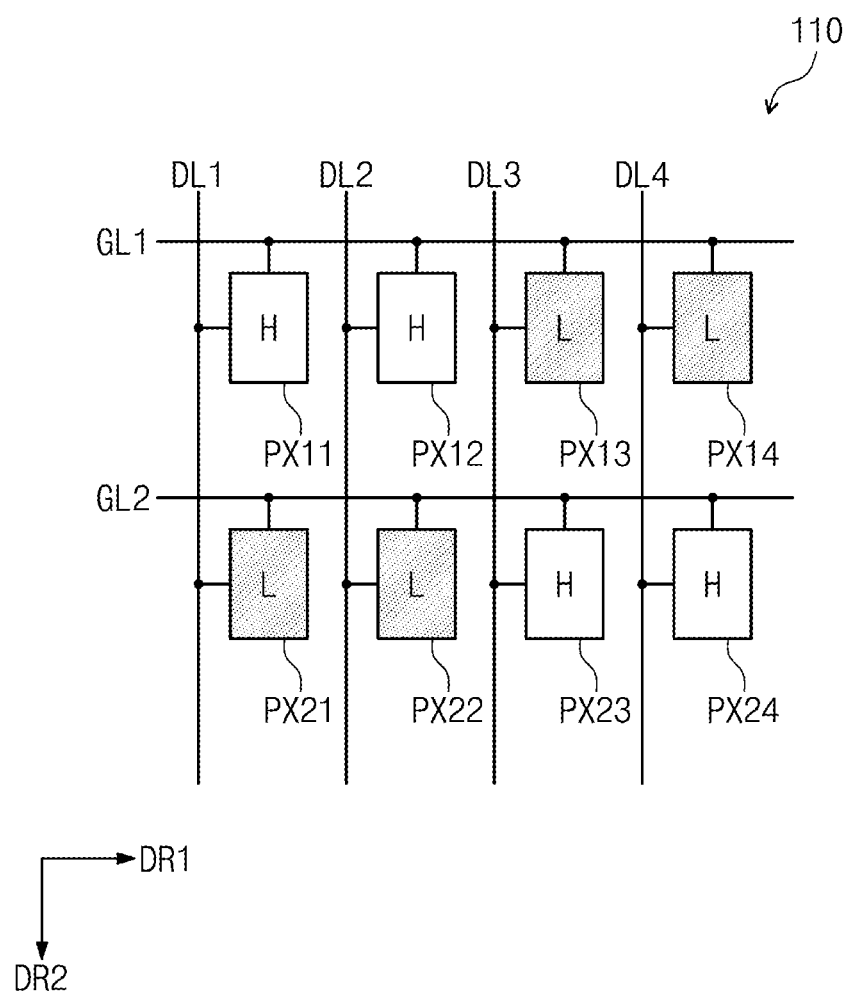
FIG. 9 is a view showing a spatial distribution pattern of an alternative exemplary embodiment of pixels of a display panel.

FIG. 9 is a view showing the spatial distribution pattern of an alternative exemplary embodiment of the pixels of the display panel.

Referring to FIG. 9, in an exemplary embodiment, each of the pixels PX11 to PX14 and PX21 to PX24 on the display panel 110 is connected to the corresponding data line among the data lines DL1 to DL4 and the corresponding gate line among the first and second gate lines GL1 and GL2. Each of the pixels PX11 to PX14 and PX21 to PX24 corresponds to one of the first gamma type H and the second gamma type L based on the spatial distribution pattern. In one exemplary embodiment, for example, the first gamma type H corresponds to the high gamma curve, and the second gamma type L corresponds to the low gamma curve. The gamma type of the pixels changes to a different gamma type every two pixels In an exemplary embodiment, as shown in FIG. 9, the gamma type of the pixels PX11 to PX14 and PX21 to PX24 is changed to a different gamma type every two pixels in the first direction DR1. In one exemplary embodiment, for example, the pixels PX11 to PX14 connected to the first gate line GL1 correspond to the first gamma type H, the first gamma type H, the second gamma type L and the second gamma type L, respectively. The pixels PX21 to PX24 connected to the second gate line GL2 correspond to the second gamma type L, the second gamma type L, the first gamma type H and the first gamma type H, respectively. The pixels PX11 to PX14 and PX21 to PX24 alternately correspond to the first gamma type H and the second gamma type L at every frame. In an exemplary embodiment, the pixels PX11, PX12, PX23, and PX24 corresponding to the first gamma type H in the k-th frame correspond to the second gamma type L in the (k+1)-th frame. In such an embodiment, the pixels PX13, PX14, PX21, and PX22 corresponding to the second gamma type L in the k-th frame correspond to the first gamma type H in the (k+1)-th frame.

Figure 10:
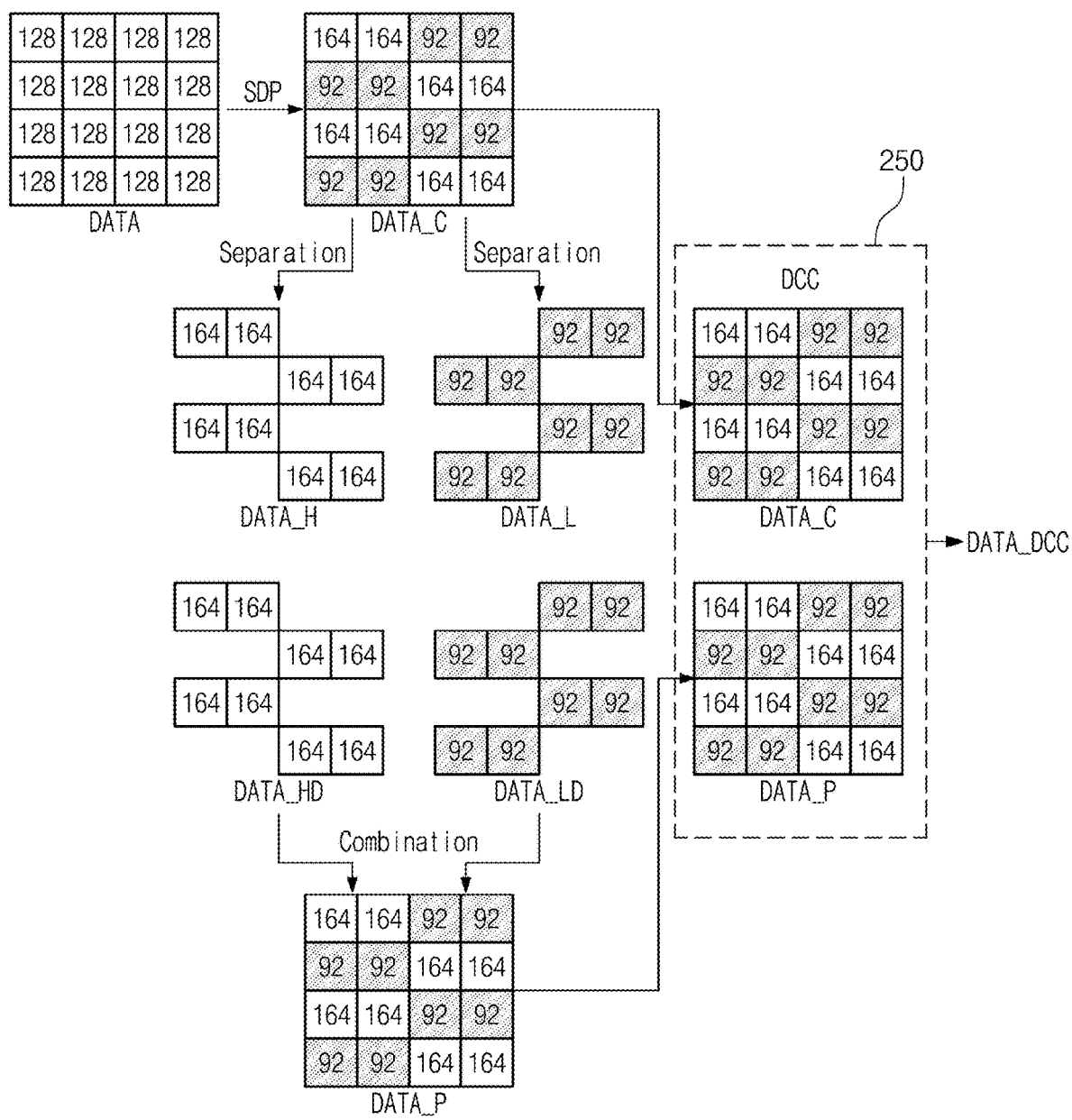
FIG. 10 is a view showing an exemplary embodiment of a process of converting an image data signal to a second image data signal by the image processing circuit shown in FIG. 3 in a display device to which the spatial distribution pattern shown in FIG. 9 is applied.

FIG. 10 is a view showing an exemplary embodiment of a process of converting an image data signal to a second image data signal by the image processing circuit shown in FIG. 3 in a display device to which the spatial distribution pattern shown in FIG. 9 is applied.

Referring to FIGS. 3 and 10, the gamma converter 210 converts the first image data signal DATA of a frame to the current image data signal DATA_C of the frame using SDP algorithm based on the spatial distribution pattern. The current image data signal DATA_C corresponding to the predetermined pixel of the display panel 110 corresponds to one of the first gamma type H and the second gamma type L depending on the position thereof in the display panel 110, at which an image corresponding to the current image data signal DATA_C is displayed, i.e., the position of the corresponding pixel. In such an embodiment, where the spatial distribution pattern is defined as shown in FIG. 9, the first image data signal DATA is alternately converted to the current image data signal DATA_C with the first gamma type H and the current image data signal DATA_C with the second gamma type L at every two pixels. In one exemplary embodiment, for example, when the gamma level of the first image data signal DATA is 128, the gamma level of the current image data signal DATA_C corresponding to the first gamma type H is converted to 164, and the gamma level of the current image data signal DATA_C corresponding to the second gamma type L is converted to 92.

The separator 221 separates the current image data signal DATA_C of the frame into the first gamma signal DATA_H corresponding to the first gamma type H and the second gamma signal DATA_L corresponding to the second gamma type L. In one exemplary embodiment, for example, when the first image data signals DATA corresponding to the pixels adjacent to each other have a same gamma level (e.g., 128), the first gamma signals DATA_H corresponding to the pixels adjacent to each other have the same gamma level (e.g., 164), and the second gamma signals DATA_L corresponding to the pixels adjacent to each other have a same gamma level (e.g., 92). Accordingly, in an exemplary embodiment, the compression algorithm and circuit configurations of the first compressor 222 and the second compressor 223 may be simplified, and the compression rate may become high. As a result, the storage capacity of the memory 230 may be substantially reduced or minimized.

The first compression gamma signal DATA_HC and the second compression gamma signal DATA_LC, which are read out from the memory 230, are output as the first decompression gamma signal DATA_HD and the second decompression gamma signal DATA_LD by the first decompressor 241 and the second decompressor 242. In such an embodiment, the first gamma signals DATA_H corresponding to the pixels adjacent to each other have the same or similar gamma level, such that the noise components of the first decompression gamma signal DATA_HD may be substantially reduced or minimized. In such an embodiment, the second gamma signals DATA_L corresponding to the pixels adjacent to each other have the same or similar gamma level, such that the noise components of the second decompression gamma signal DATA_LD may be substantially reduced or minimized.

The combiner 243 combines the first decompression gamma signal DATA_HD and the second decompression gamma signal DATA_LD to output the previous image data signal DATA_P of a previous frame.

Figure 11:
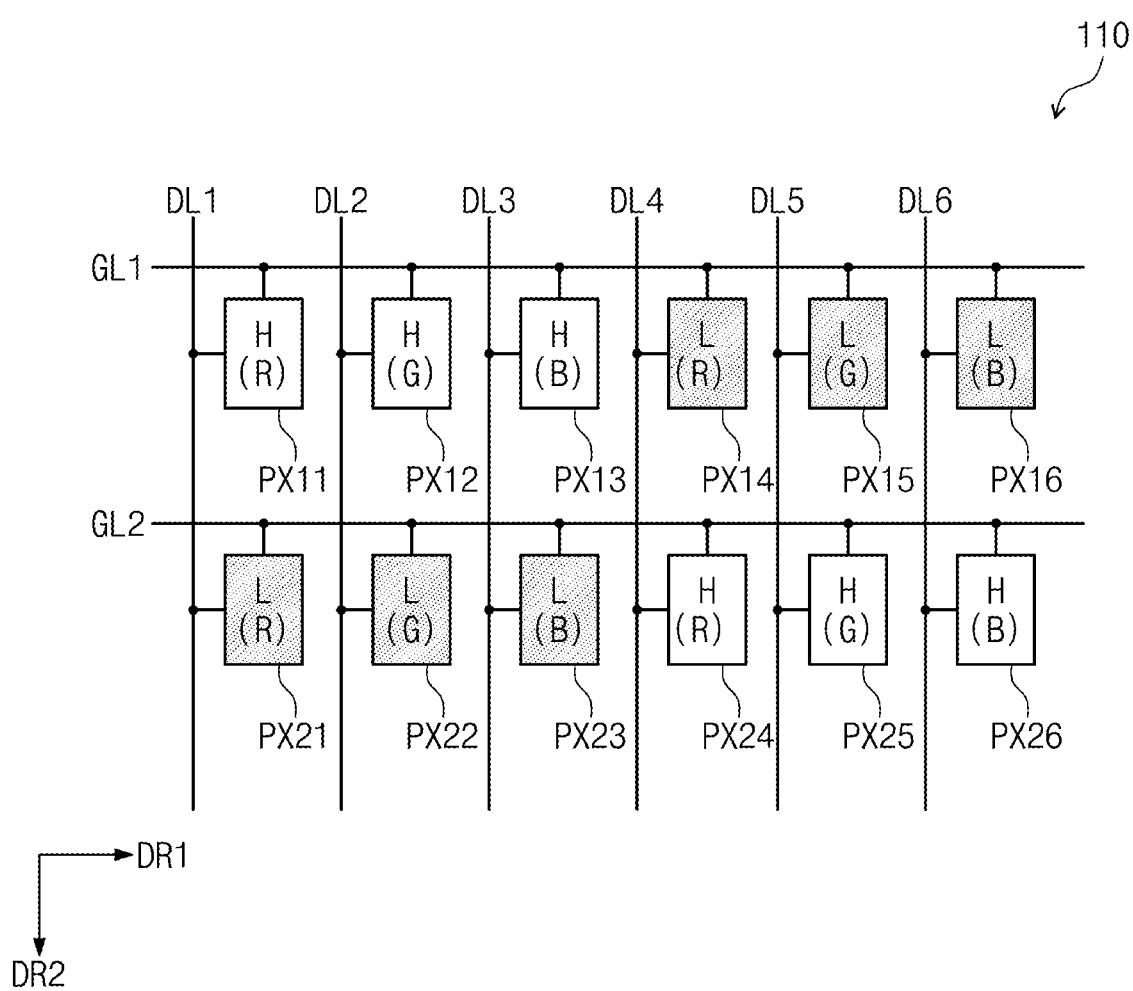
FIG. 11 is a view showing a spatial distribution pattern of another alternative exemplary embodiment of pixels of a display panel.

FIG. 11 is a view showing a spatial distribution pattern of another alternative exemplary embodiment of pixels of a display panel.

Referring to FIG. 11, each of the pixels PX11 to PX16 and PX21 to PX26 on the display panel 110 is connected to the corresponding data line among first to sixth data lines DL1 to DL6 and the corresponding gate line among the first and second gate lines GL1 and GL2. Each of the pixels PX11 to PX16 and PX21 to PX26 corresponds to one of the first gamma type H and the second gamma type L based on the spatial distribution pattern. In one exemplary embodiment, for example, the first gamma type H corresponds to the high gamma curve HG (refer to FIG. 5), and the second gamma type L corresponds to the low gamma curve LG (refer to FIG. 6).

In an exemplary embodiment, as shown in FIG. 11, three pixels adjacent to each other in the first direction DR1 among the pixels PX11 to PX16 and PX21 to PX26 correspond to a same gamma type, and the gamma type corresponding to the three pixels is changed every three pixels. In one exemplary embodiment, for example, three pixels PX11 to PX13 connected to the first gate line GL1 and adjacent to each other in the first direction DR1 correspond to the first gamma type H, and next three pixels PX14 to PX16 connected to the first gate line GL1 and adjacent to each other in the first direction DR1 correspond to the second gamma type L. Three pixels PX21 to PX23 connected to the second gate line GL2 and adjacent to each other in the first direction DR1 correspond to the second gamma type L, and next three pixels PX24 to PX26 connected to the second gate line GL2 and adjacent to each other in the first direction DR1 correspond to the first gamma type H. In one exemplary embodiment, for example, each of the pixels PX11 to PX16 and PX21 to PX26 corresponds to one of a red pixel R, a green pixel G and a blue pixel B, and the pixels PX11 to PX16 and PX21 to PX26 repeatedly correspond to the red pixel R, the green pixel G and the blue pixel B in order of the red pixel R, the green pixel G, and the blue pixel B in the first direction DR1.

The pixels PX11 to PX16 and PX21 to PX26 alternately correspond to the first gamma type H and the second gamma type L at every frame. In one exemplary embodiment, for example, the pixels PX11 to PX13 and PX24 to PX26 corresponding to the first gamma type H in the k-th frame correspond to the second gamma type L in the (k+1)-th frame. In such an embodiment, the pixels PX14 to PX16 and PX21 to PX23 corresponding to the second gamma type L in the k-th frame correspond to the first gamma type H in the (k+1)-th frame.

Although not shown in figures, in an alternative exemplary embodiment, where the pixels on the display panel 110 correspond to not only the red pixel R, the green pixel G and the blue pixel B but also a white pixel W, the pixels may alternately correspond to the first gamma type H and the second gamma type L at every four pixels in the first direction DR1.

Figure 12:
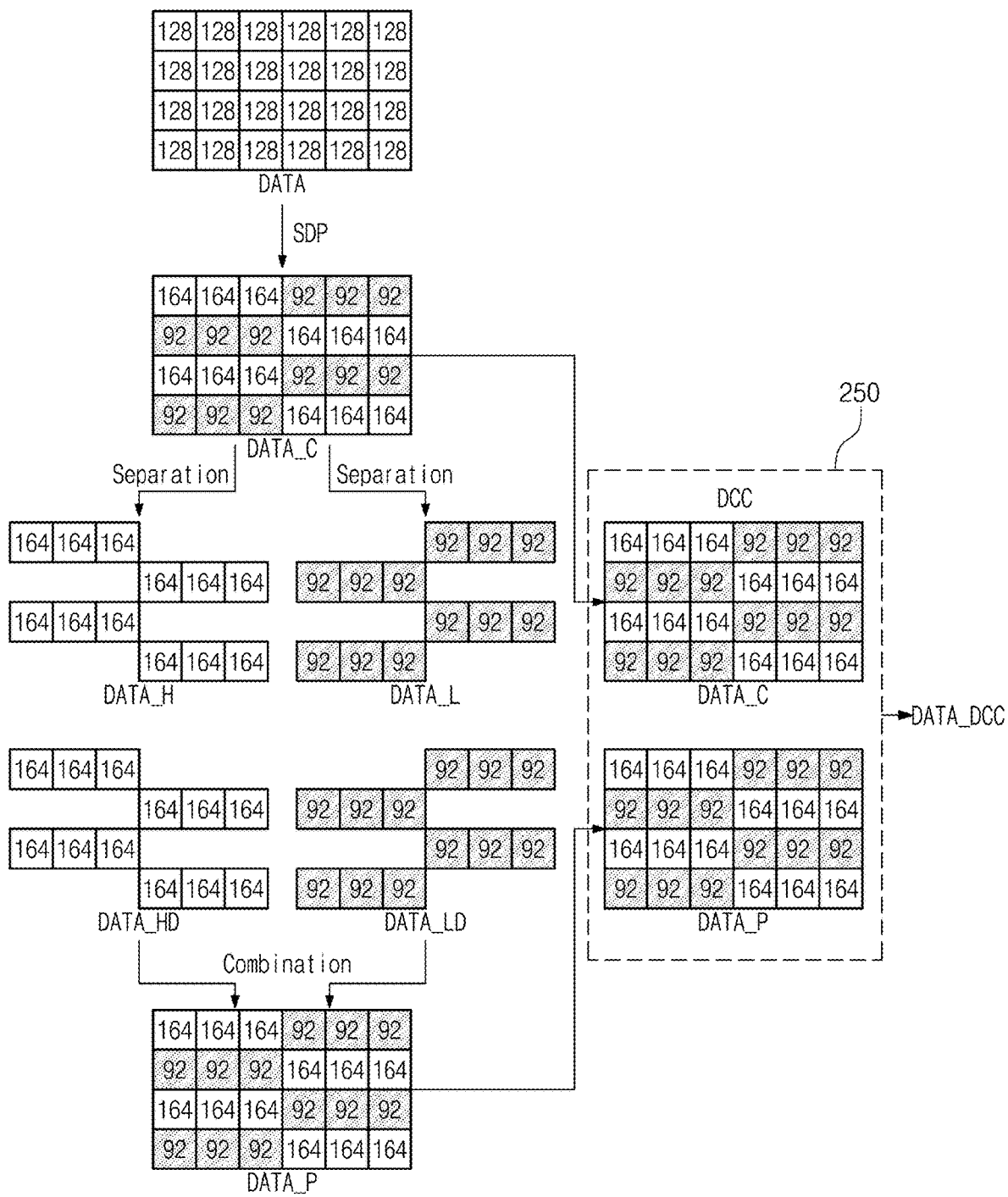
FIG. 12 is a view showing an exemplary embodiment of a process of converting an image data signal to a second image data signal by the image processing circuit shown in FIG. 6 in a display device to which the spatial distribution pattern shown in FIG. 11 is applied.

FIG. 12 is a view showing an exemplary embodiment of a process of converting the image data signal to the second image data signal by the image processing circuit shown in FIG. 6 in the display device to which the spatial distribution pattern shown in FIG. 11 is applied.

Referring to FIGS. 3 and 12, in an exemplary embodiment, the gamma converter 210 converts the first image data signal DATA of a frame to the current image data signal DATA_C of the current frame using the SDP algorithm based on the spatial distribution pattern. In an exemplary embodiment, where the spatial distribution pattern is defined as shown in FIG. 11, the first image data signal DATA is converted to the current image data signal DATA-C to alternately have the first gamma type H and the second gamma type L at every three pixels. Processes of separating the current image data signal DATA_C into the first gamma signal DATA_H and the second gamma signal DATA_L, compressing and storing the first gamma signal DATA_H and the second gamma signal DATA_L in the memory 230, and decompressing and combining the stored signals to output the previous image data signal DATA_P of a previous frame are similar to those of the exemplary embodiments described above with reference to FIG. 10, and any repetitive detailed descriptions thereof will thereinafter be omitted.

Figure 13:
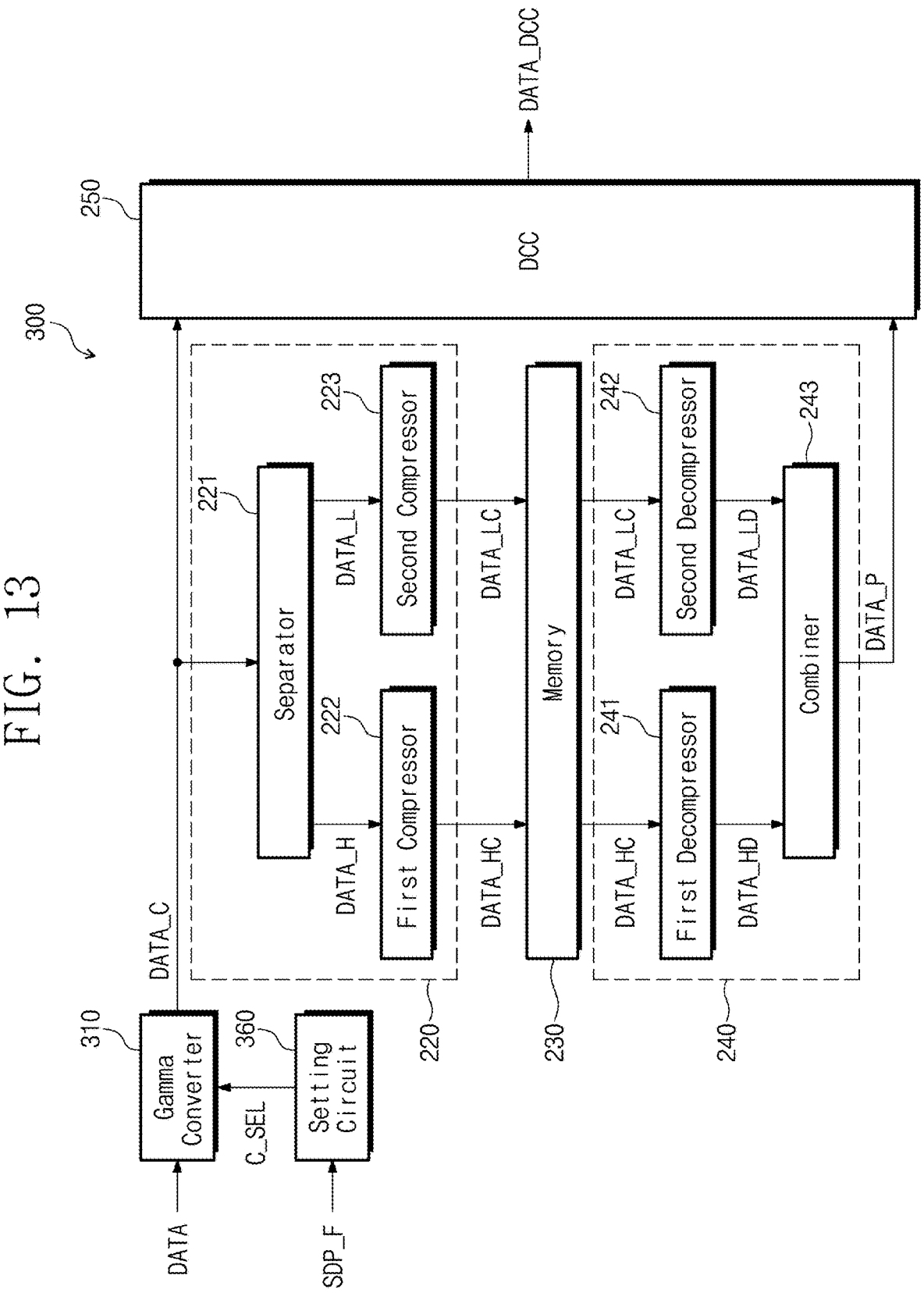
FIG. 13 is a block diagram showing an image processing circuit according to an alternative exemplary embodiment of the disclosure.

FIG. 13 is a block diagram showing an image processing circuit 300 according to an alternative exemplary embodiment of the disclosure.

Referring to FIG. 13, in an exemplary embodiment, the image processing circuit 300 further includes a setting circuit 360 in addition to the configurations of the image processing circuit 200 shown in FIG. 3. The setting circuit 360 receives a flag signal SDP_F indicating whether the first image data signal DATA provided from the outside is a SDP mode signal, and outputs a selection signal C_SEL in response to the flag signal SDP_F.

In an exemplary embodiment, the flag signal SDP_F may be signals included in the control signals CTRL shown in FIG. 1 or a signal provided through a separate signal line. The flag signal SDP_F indicates whether the first image data signal DATA is the signal converted to the SDP mode. In one exemplary embodiment, for example, when the flag signal SDP_F has a first level (e.g., a low level), the first image data signal DATA is a normal mode signal as the first image data signal DATA shown in FIG. 7. In one exemplary embodiment, for example, when the flag signal SDP_F has a second level (e.g., a high level), the first image data signal DATA is the SDP mode signal as the current image data signal DATA_C shown in FIG. 7. In such an embodiment, when the first image data signal DATA provided from an external source or host (e.g., a graphic controller, an application processor, or a mobile processor, etc.) is the signal converted to the SDP mode, the flag signal SDP_F has the second level.

The setting circuit 360 outputs the selection signal C_SEL having the first level when the flag signal SDP_F has the first level, and outputs the selection signal C_SEL having the second level when the flag signal SDP_F has the second level.

A gamma converter 310 operates in response to the selection signal C_SEL. In one exemplary embodiment, for example, when the selection signal C_SEL has the first level, the gamma converter 310 converts the first image data signal DATA of a frame to the current image data signal DATA_C of the current frame corresponding to one of the first gamma type H and the second gamma type L. In such an embodiment, when the selection signal C_SEL has the second level different from the first level, the gamma converter 310 intactly outputs the first image data signal DATA as the current image data signal DATA_C of the current frame.

Figure 14:
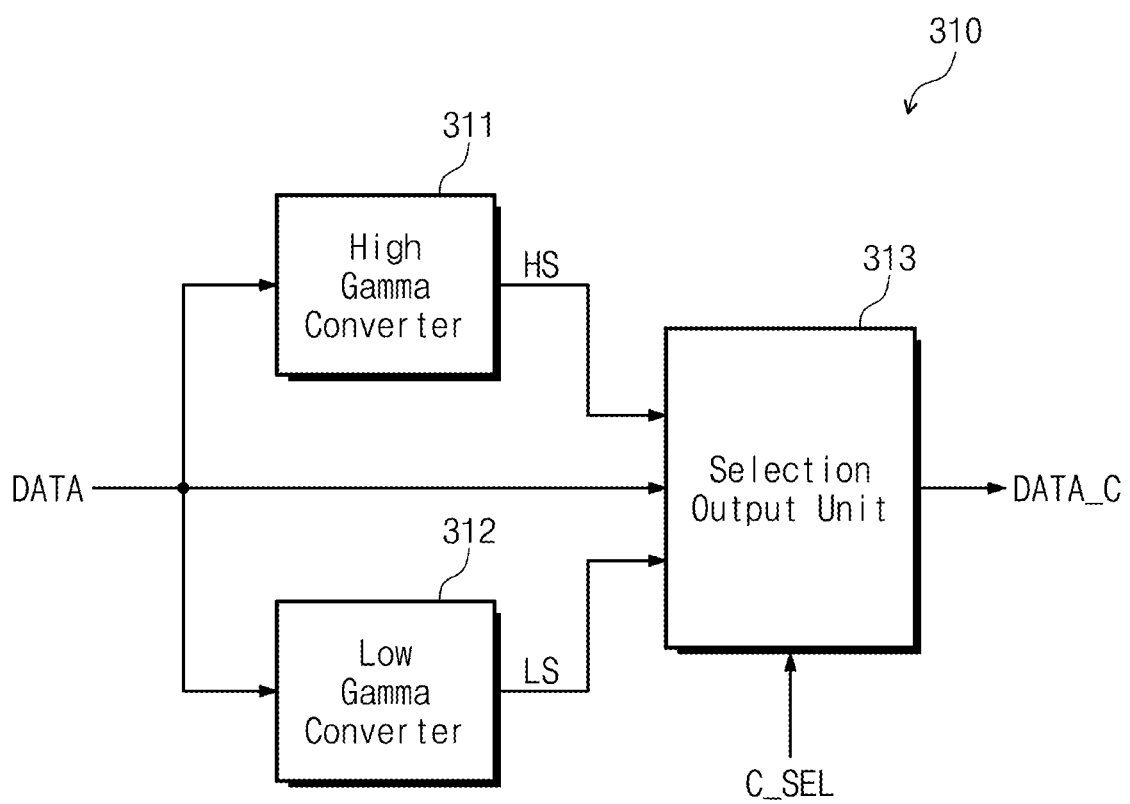
FIG. 14 is a block diagram showing a gamma converter according to an alternative exemplary embodiment of the disclosure.

FIG. 14 is a block diagram showing a gamma converter according to an alternative exemplary embodiment of the disclosure.

Referring to FIG. 14, in an exemplary embodiment, the gamma converter 310 includes a high gamma converter 311, a low gamma converter 312 and a selection output unit 313. The high gamma converter 311 converts the first image data signal DATA to a high gamma signal HS corresponding to the first gamma type H. The low gamma converter 312 converts the first image data signal DATA to a low gamma signal LS corresponding to the second gamma type L. The selection output unit 313 outputs one of the first image data signal DATA, the high gamma signal HS, and the low gamma signal LS in response to the selection signal C_SEL as the current image data signal DATA_C.

In one exemplary embodiment, for example, when the selection signal C_SEL has the first level, the selection output unit 313 outputs one of the high gamma signal HS and the low gamma signal LS as the current image data signal DATA_C depending on the position of a pixel, to which the first image data signal DATA is applied, on the display panel 110. In such an embodiment, when the selection signal C_SEL has the second level, the selection output unit 313 intactly outputs the first image data signal DATA as the current image data signal DATA_C.

When the first image data signal provided from the external source or host (e.g., the graphic controller, the application processor, or the mobile processor, etc.) is the signal converted to the SDP mode, the gamma converter 310 may not operate a separate conversion operation, and thus the first image data signal DATA is bypassed to be output as the current image data signal DATA_C. Accordingly, the image processing circuit 300 shown in FIG. 13 may receive not only the first image data signal DATA of the normal mode, but also the first image data signal DATA converted to the SDP mode.

Figure 15:
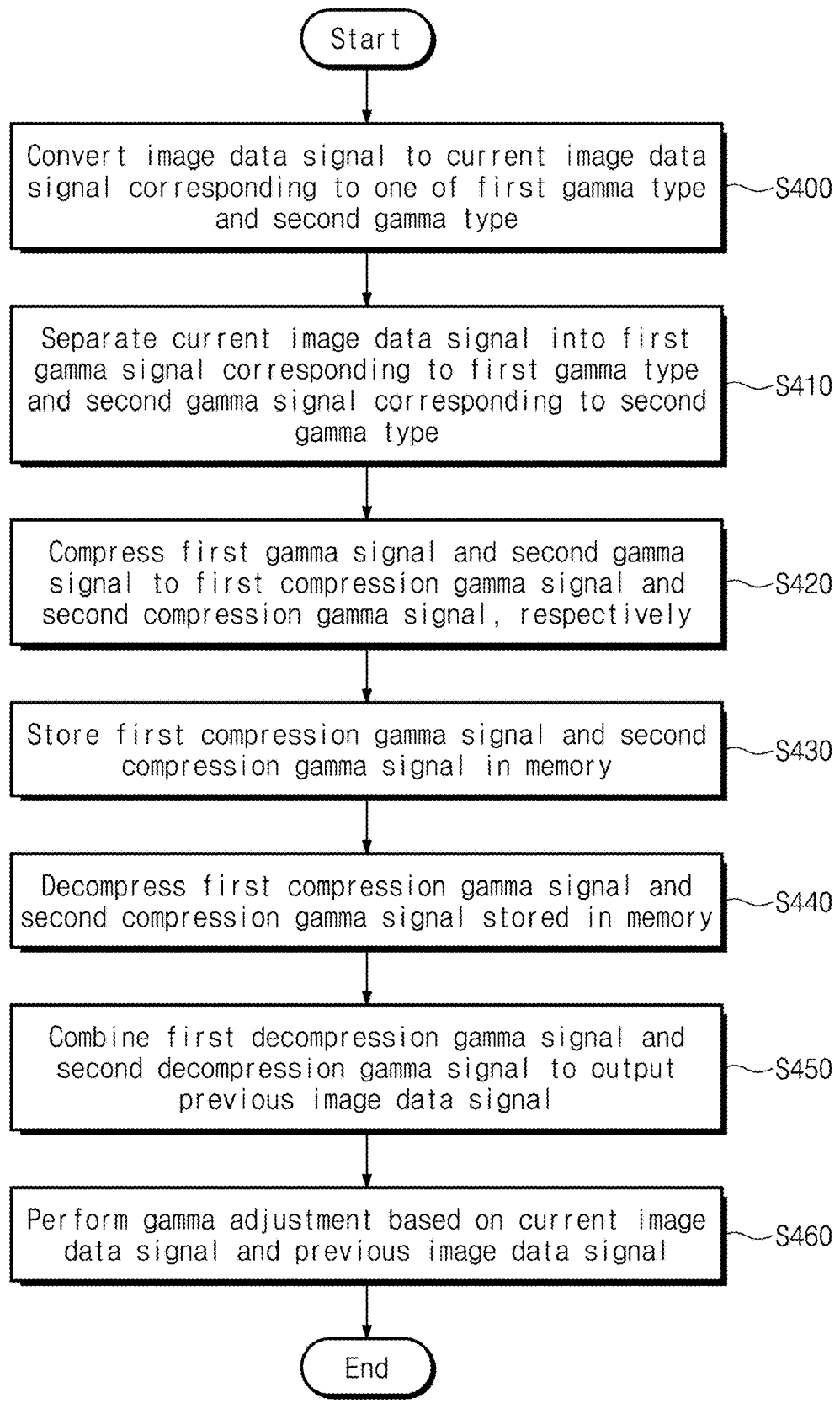
FIG. 15 is a flowchart showing a method of driving a display device according to an exemplary embodiment of the disclosure.

FIG. 15 is a flowchart showing a method of driving a display device according to an exemplary embodiment of the disclosure.

Referring to FIGS. 3 and 15, in an exemplary embodiment, the first image data signal DATA of a frame is converted to the current image data signal DATA_C of the current frame corresponding to one of the first gamma type H and the second gamma type L based on the spatial distribution pattern (S400). In one exemplary embodiment, for example, the gamma converter 210 of the image processing circuit 200 converts the first image data signal DATA to the current image data signal DATA_C corresponding to one of the first gamma type H and the second gamma type L based on the spatial distribution pattern.

In such an embodiment, the current image data signal DATA_C is separated into the first gamma signal DATA_H corresponding to the first gamma type H and the second gamma signal DATA_L corresponding to the second gamma type L (S410). In one exemplary embodiment, for example, the separator 221 separates the current image data signal DATA_C into the first gamma signal DATA_H corresponding to the first gamma type H and the second gamma signal DATA_L corresponding to the second gamma type L.

In such an embodiment, the first gamma signal DATA_H is compressed to be output as the first compression gamma signal DATA_HC, and the second gamma signal DATA_L is compressed to be output as the second compression gamma signal DATA_LC (S420). In one exemplary embodiment, for example, the first compressor 222 compresses the first gamma signal DATA_H to output the first compression gamma signal DATA_HC, and the second compressor 223 compresses the second gamma signal DATA_L to output the second compression gamma signal DATA_LC.

In such an embodiment, the first compression gamma signal DATA_HC and the second compression gamma signal DATA_LC are stored in the memory 230 (S430).

In such an embodiment, the first compression gamma signal DATA_HC and the second compression gamma signal DATA_LC from the memory 230 are decompressed (S440). In one exemplary embodiment, for example, the first decompressor 241 and the second decompressor 242 respectively receive the first compression gamma signal DATA_HC and the second compression gamma signal DATA_LC from the memory 230, and respectively output the first decompression gamma signal DATA_HD and the second decompression gamma signal DATA_LD by the predetermined decompression algorithm.

In such an embodiment, the first decompression gamma signal DATA_HD and the second decompression gamma signal DATA_LD are combined to be output as the previous image data signal DATA_P of a previous frame (S450). In one exemplary embodiment, the combiner 243 combines the first decompression gamma signal DATA_HD and the second decompression gamma signal DATA_LD to output the previous image data signal DATA_P of the previous frame.

In such an embodiment, the gamma adjustment is performed based on the current image data signal DATA_C from the gamma converter 210 and the previous image data signal DATA_P from the decompression circuit 240 to output the second image data signal DATA_DCC (S460). In one exemplary embodiment, the gamma correction circuit 250 performs the gamma adjustment based on the current image data signal DATA_C from the gamma converter 210 and the previous image data signal DATA_P from the decompression circuit 240, and thereby outputs the second image data signal DATA_DCC. Although some exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. An image processing circuit comprising:
a memory;
a gamma converter which converts a first image data signal of a frame to output a current image data signal of a current frame corresponding to one of a first gamma type and a second gamma type based on a spatial distribution pattern;
a compression circuit which separates the current image data signal of the current frame into a first gamma signal corresponding to the first gamma type and a second gamma signal corresponding to the second gamma type, and compresses the first gamma signal and the second gamma signal to a first compression gamma signal and a second compression gamma signal, respectively, wherein the first compression gamma signal and the second compression gamma signal are stored in the memory;
a decompression circuit which decompresses the first compression gamma signal and the second compression gamma signal stored in the memory, and combines a first decompression gamma signal and a second decompression gamma signal to output a previous image data signal of a previous frame; and
a gamma correction circuit which performs a gamma adjustment based on the current image data signal of the current frame and the previous image data signal of the previous frame to output a second image data signal of the current frame.

2. The image processing circuit of claim 1, wherein the first gamma type is based on a high gamma curve, and the second gamma type is based on a low gamma curve.

3. The image processing circuit of claim 1, wherein the gamma converter comprises:

a high gamma converter which converts the first image data signal of the frame to a high gamma signal based on a high gamma curve corresponding to the first gamma type;
a low gamma converter which converts the first image data signal of the frame to a low gamma signal based on a low gamma curve corresponding to the second gamma type; and
a selection output unit which outputs one of the high gamma signal and the low gamma signal as the current image data signal of the current frame.

4. The image processing circuit of claim 1, wherein the compression circuit comprises:
a separator which separates the current image data signal of the current frame into the first gamma signal corresponding to the first gamma type and the second gamma signal corresponding to the second gamma type;
a first compressor which compresses the first gamma signal to output the first compression gamma signal; and
a second compressor which compresses the second gamma signal to output the second compression gamma signal.

5. The image processing circuit of claim 1, wherein the decompression circuit comprises:
a first decompressor which decompresses the first compression gamma signal from the memory to output the first decompression gamma signal;
a second decompressor which decompresses the second compression gamma signal from the memory to output the second decompression gamma signal; and
a combiner which combines the first decompression gamma signal and the second decompression gamma signal to output the previous image data signal of the previous frame.

6. A display device comprising:
a display panel comprising a plurality of data lines, a plurality of gate lines, and a plurality of pixels connected to the data lines and the gate lines;
a drive controller which receives a first image data signal of a frame to perform a gamma adjustment and outputs a second image data signal of a current frame; and
a data driver which provides the second image data signal of the current frame to the data lines,
wherein the drive controller comprises:
a memory;
a gamma converter which converts the first image data signal of the frame to a current image data signal of the current frame corresponding to one of a first gamma type and a second gamma type depending on a position in the display panel, at which an image corresponding to the first image data signal of the frame is displayed;
a compression circuit which separates the current image data signal of the current frame into a first gamma signal corresponding to the first gamma type and a second gamma signal corresponding to the second gamma type, and compresses the first gamma signal and the second gamma signal to a first compression gamma signal and a second compression gamma signal to store the first compression gamma signal and the second compression gamma signal in the memory;
a decompression circuit which decompresses the first compression gamma signal and the second compression gamma signal stored in the memory and combines a first decompression gamma signal and a second decompression gamma signal to output a previous image data signal of a previous frame; and
a gamma correction circuit which performs a gamma adjustment based on the current image data signal of the current frame and the previous image data signal of the previous frame to output the second image data signal of the current frame.

7. The display device of claim 6, wherein
the first gamma type is based on a high gamma curve, and
the second gamma type is based on a low gamma curve.

8. The display device of claim 6, wherein the gamma converter comprises:
a high gamma converter which converts the first image data signal of the frame to a high gamma signal based on a high gamma curve corresponding to the first gamma type;
a low gamma converter which converts the first image data signal of the frame to a low gamma signal based on a low gamma curve corresponding to the second gamma type; and
a selection output unit which outputs one of the high gamma signal and the low gamma signal as the current image data signal depending on a position in the display panel, at which an image corresponding to the first image data signal of the frame is displayed.

9. The display device of claim 6, wherein the compression circuit comprises:
a separator which separates the current image data signal of the current frame into the first gamma signal corresponding to the first gamma type and the second gamma signal corresponding to the second gamma type;
a first compressor which compresses the first gamma signal to output the first compression gamma signal; and
a second compressor which compresses the second gamma signal to output the second compression gamma signal.

10. The display device of claim 6, wherein the decompression circuit comprises:
a first decompressor which decompresses the first compression gamma signal from the memory to output the first decompression gamma signal;
a second decompressor which decompresses the second compression gamma signal from the memory to output the second decompression gamma signal; and
a combiner which combines the first decompression gamma signal and the second decompression gamma signal to output the previous image data signal of the previous frame.

11. The display device of claim 6, wherein
the memory comprises a first area and a second area,
the first compression gamma signal is stored in the first area of the memory, and
the second compression gamma signal is stored in the second area of the memory.

12. The display device of claim 6, wherein the gamma correction circuit comprises a dynamic capacitance compensation circuit.

13. The display device of claim 6, wherein the gamma converter outputs a first image data signal of the frame as the current image data signal of the current frame when the first image data signal of the frame is a spatially distributed signal.

14. The display device of claim 13, further comprising:
a setting circuit which receives a mode signal indicating whether the first image data signal of the frame is the spatially distributed signal and outputs a conversion selection signal corresponding to the mode signal, wherein the gamma converter outputs the first image data signal of the frame as the current image data signal of the current frame when the conversion selection signal has a second level.

15. The display device of claim 13, wherein the gamma converter converts the first image data signal of the frame to the current image data signal of the current frame corresponding to one of the first gamma type and the second gamma type when the conversion selection signal has a first level different from the second level.

16. A method of driving a display device comprising a display panel comprising a plurality of data lines, a plurality of gate lines, and a plurality of pixels connected to the data lines and the gate lines, the method comprising:

converting a first image data signal of a frame to a current image data signal of a current frame corresponding to one of a first gamma type and a second gamma type depending on a position in the display panel, at which an image corresponding to the first image data signal of the frame is displayed;

separating the current image data signal of the current frame into a first gamma signal corresponding to the first gamma type and a second gamma signal corresponding to the second gamma type;

compressing the first gamma signal and the second gamma signal to a first compression gamma signal and a second compression gamma signal, respectively, to store the first compression gamma signal and the second compression gamma signal in a memory;

decompressing the first compression gamma signal and the second compression gamma signal stored in the memory;

combining the decompressed first compression gamma signal and the decompressed second compression gamma signal to output a previous image data signal of a previous frame;

performing a gamma adjustment based on the current image data signal of the current frame and the previous image data signal of the previous frame; and outputting a second image data signal of the current frame to the pixels.

17. The method of claim 16, wherein
the first gamma type is based on a high gamma curve, and
the second gamma type is based on a low gamma curve.

18. The method of claim 16, wherein the converting the first image data signal of the frame comprises:

converting the first image data signal of the frame to a high gamma signal based on a high gamma curve corresponding to the first gamma type;

converting the first image data signal of the frame to a low gamma signal based on a low gamma curve corresponding to the second gamma type; and outputting one of the high gamma signal and the low gamma signal as the current image data signal of the current frame depending on the position in the display panel, at which the image corresponding to the first image data signal of the frame is displayed.

19. The method of claim 16, wherein
the memory comprises a first area and a second area,
the first compression gamma signal is stored in the first area of the memory, and
the second compression gamma signal is stored in the second area of the memory.

20. The method of claim 16, further comprising:

receiving a mode signal indicating whether a first image data signal of the frame is a spatially distributed signal;

outputting a conversion selection signal corresponding to the mode signal;

outputting the first image data signal of the frame as it is as a current image data signal of the current frame when the conversion selection signal has a second level; and converting the first image data signal of the frame and outputting a converted first image data signal as the current image data signal of the current frame when the conversion selection signal has a first level different from the second level, wherein the converted first image data signal corresponds to the one of the first gamma type and the second gamma type.

* * * * *